(12) United States Patent
Ng et al.

(10) Patent No.: US 9,742,276 B2
(45) Date of Patent: *Aug. 22, 2017

(54) ALTERNATING CURRENT INJECTION FOR CONSTANT-ON TIME BUCK CONVERTER—A REGULATOR CONTROL METHOD

(71) Applicant: Alpha and Omega Semiconductor (Cayman) Ltd., Sunnyvale, CA (US)

(72) Inventors: Kong Soon Ng, San Jose, CA (US); Wei-Chi Huang, Taipei (TW); Jean-Shin Wu, Taipei (TW)

(73) Assignee: Alpha & Omega Semiconductor (Cayman), Ltd., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/838,058

(22) Filed: Aug. 27, 2015

(65) Prior Publication Data

US 2015/0372595 A1  Dec. 24, 2015

Related U.S. Application Data

(63) Continuation of application No. 14/458,464, filed on Aug. 13, 2014, now Pat. No. 9,154,034.

(30) Foreign Application Priority Data

Feb. 21, 2014 (TW) .............................. 103105853 A

(51) Int. Cl.
*H02M 3/158* (2006.01)
*H02M 3/156* (2006.01)

(52) U.S. Cl.
CPC ........... *H02M 3/158* (2013.01); *H02M 3/156* (2013.01)

(58) Field of Classification Search
CPC .............. H02M 2001/0009; H02M 2001/0032
See application file for complete search history.

(56) References Cited

U.S. PATENT DOCUMENTS

| 7,292,018 B2* | 11/2007 | Chen | H02M 3/1588 |
| | | | 323/222 |
| 9,276,477 B2* | 3/2016 | Thomas | H02M 3/1588 |
| 2006/0043943 A1* | 3/2006 | Huang | H02M 3/1584 |
| | | | 323/222 |
| 2007/0120547 A1* | 5/2007 | Tateishi | H02M 3/158 |
| | | | 323/282 |
| 2009/0079409 A1* | 3/2009 | Chang | H02M 3/157 |
| | | | 323/284 |
| 2009/0091306 A1 | 4/2009 | Hojo et al. | |

(Continued)

*Primary Examiner* — Timothy J Dole
*Assistant Examiner* — Yusef Ahmed
(74) *Attorney, Agent, or Firm* — Lance A. Li; Chein-Hwa Tsao; 5Suns

(57) ABSTRACT

The present invention discloses a voltage control method. At first, the load voltage of the load is divided to generate a feedback voltage. The feedback voltage and a triangular wave of a triangular wave periodic signal, including the positive voltage and negative voltage, are combined to generate a sum signal. The sum signal is compared with a target voltage, and when the sum signal is less than the target voltage signal, a control signal is generated to control the switches to turn on or off. Finally, the switch receives the control signal and accordingly providing an input voltage to update and stabilize the load voltage.

20 Claims, 5 Drawing Sheets

(56) References Cited

U.S. PATENT DOCUMENTS

| | | | | |
|---|---|---|---|---|
| 2009/0128113 A1* | 5/2009 | Ryoo | ............... | G05F 1/618 323/283 |
| 2010/0066328 A1* | 3/2010 | Shimizu | ............... | H02M 3/1588 323/282 |
| 2011/0241641 A1* | 10/2011 | Chen | ............... | H02M 3/1588 323/284 |
| 2014/0119076 A1* | 5/2014 | Chang | ............... | H02M 1/36 363/80 |

* cited by examiner

FIG. 1 - Prior Art

ALTERNATING CURRENT INJECTION FOR CONSTANT-ON TIME BUCK CONVERTER—A REGULATOR CONTROL METHOD

CROSS-REFERENCE TO RELATED APPLICATIONS

This application is a continuation application of U.S. application Ser. No. 14/458,464, filed on Aug. 13, 2014, which relies for priority upon Taiwanese patent application serial number 103105853, filed Feb. 21, 2014, the contents of which are incorporated herein in their entirety by reference.

FIELD OF PRESENT INVENTION

The present invention relates to a regulator control method, and particularly relates to an alternating Current Injection for Constant-On Time Buck Converter.

BACKGROUND OF RELATED ART

The circuit design for controlling voltage/current utilizing high-side FET and low-side FET have many applications involving regulation of electrical power supplies of the integrated circuit. In such application, current flows from the junction between the source of high-side FET and the drain of low-side FET to the load. This load is connected in series with an inductor and connected in parallel with a capacitor. When the cycle of operation starts, high-side FET is turned on, low-side FET is turned off allowing current to flow through high-side FET to inductors, capacitors and load. This current increases as the capacitor charges. When the voltage across the load reaches the target level, the high-side FET is turned off, low-side FET is turned on, and this current decreases as the capacitor discharges. Hence by switching the high side FET and low side FET alternatively between on and off, the output voltage will not be changed due to the increase or decrease of the inductor current.

As shown in FIG. 1, the conventional switching controller consists of a comparator 10, a high-side FET 12 and a low-side FET 14. The drain of the high-side FET 12 is electrically connected to the input voltage $V_{IN}$, and the source of the high-side FET 12 is connected to the drain of the low-side FET 14. The source of the low-side FET 14 is connected to ground. The gate of the high-side FET 12 and that of the low-side FET 14 are respectively connected to the comparator 10. When a sufficient voltage is applied to the transistor gate electrode, corresponding current will flow between the drain and the source of the transistor. Through voltage/current control operation, the gate of high-side FET 12 and that of low-side FET 14 are alternately switched on and off. Furthermore, an inductor 16 is connected to the junction connecting the source of high-side FET 12 and the drain of the low-side FET 14. A load 18 is connected in series with the inductor and to the ground, and the voltage across the load 18 is the output voltage $V_o$.

When the high-side FET and the low-side FET is about to switch from on to off or vice versa, the gate of the transistors will remain in the original state of on or off for some time. As such, a feedback voltage F is generated from the output voltage $V_O$ using a voltage divider 20. This feedback voltage F is fed to the comparator 10 and is compared to the target voltage T produced by a target voltage generator 22. When the feedback voltage F is equal to the target voltage T, the comparator 10 produces trigger signal to switch the on/off state of the high-side FET 12 and low-side FET 14 respectively. In addition, a capacitor 24 is connected in parallel with the load 18. The capacitor delays the output voltage across the load 18 relative to the output current through the load 18. This leads to an unstable output voltage $V_O$.

As mentioned above, the conventional switching controllers utilize the ripple in the output voltage Vo to regulate the output current. However, this ripple is undesirable in certain circuit applications. Therefore equivalent series resistance (ESR) 26 of the capacitor 24 is used to control the increase and decrease of the output voltage Vo. To achieve this purpose, the equivalent series resistance 26 has to be large enough so that the capacitor 24 acts like a resistor, so the phase of the output voltage Vo across load 18 corresponds to the leading current flowing through the load 18, thereby enabling stable operation.

For example, a ceramic capacitor with an ESR of 20 million ohms may be replaced with a tantalum capacitor with an ERS of 200-600 million ohms. However, the calculation may be difficult for the engineer since the comparator 10 and FETs 12, 14 are manufactured and packaged by the first manufacturer while load 18 and capacitor 24 are made by second manufacturer; thus the ESR 26 is usually out of control of the first manufacturer. Furthermore, the ESR 26 of the capacitor 24 often depends on factors such as the manufacturing method, material, and temperature of the capacitor.

Accordingly, in view of the above problems, the present invention proposes a regulating method to solve the problems arising from conventional design.

DESCRIPTION OF THE SPECIFIC EMBODIMENTS

Figure 1:
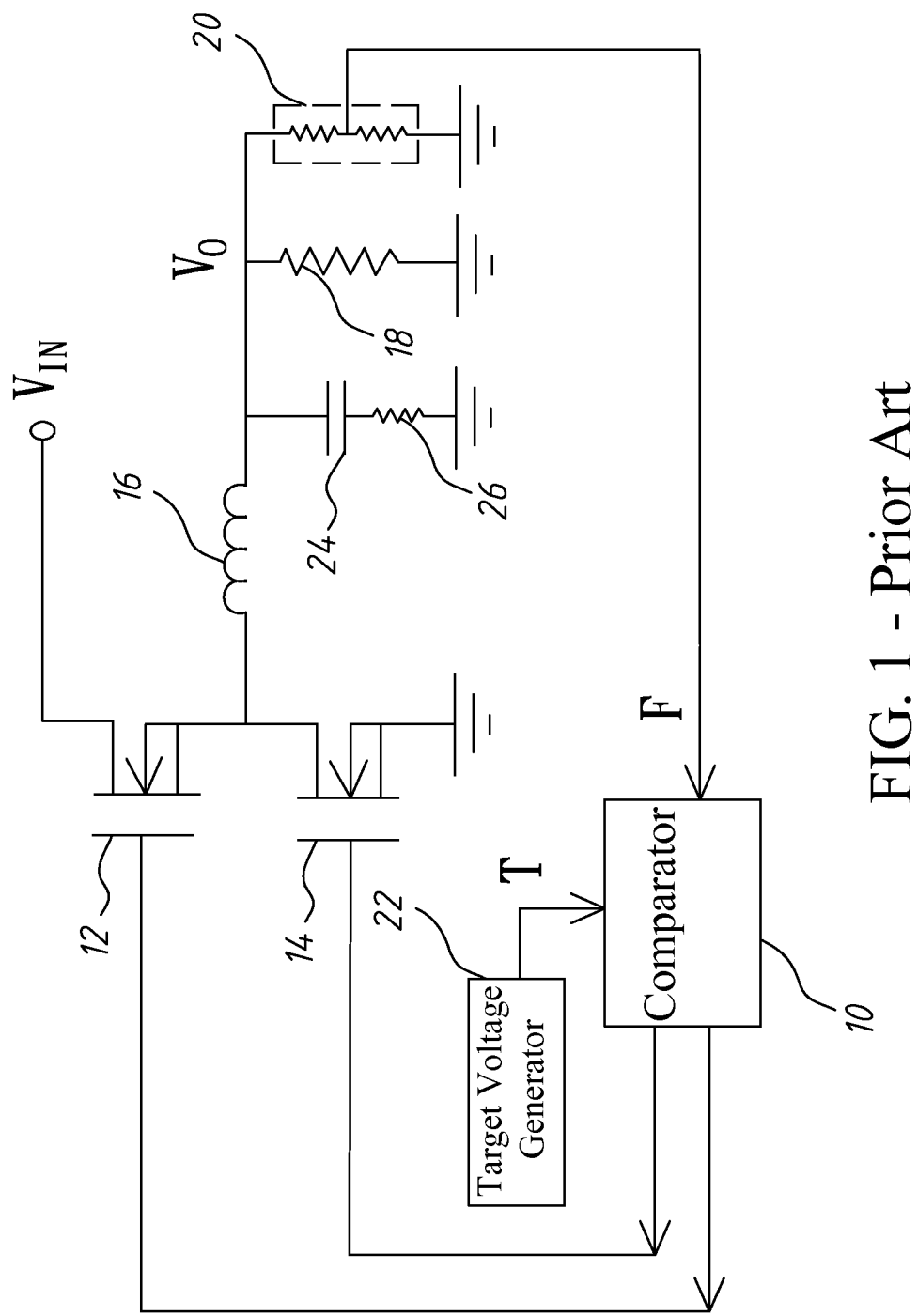
FIG. 1 is a circuit diagram of a switching controller of the prior art.
Figure 2:
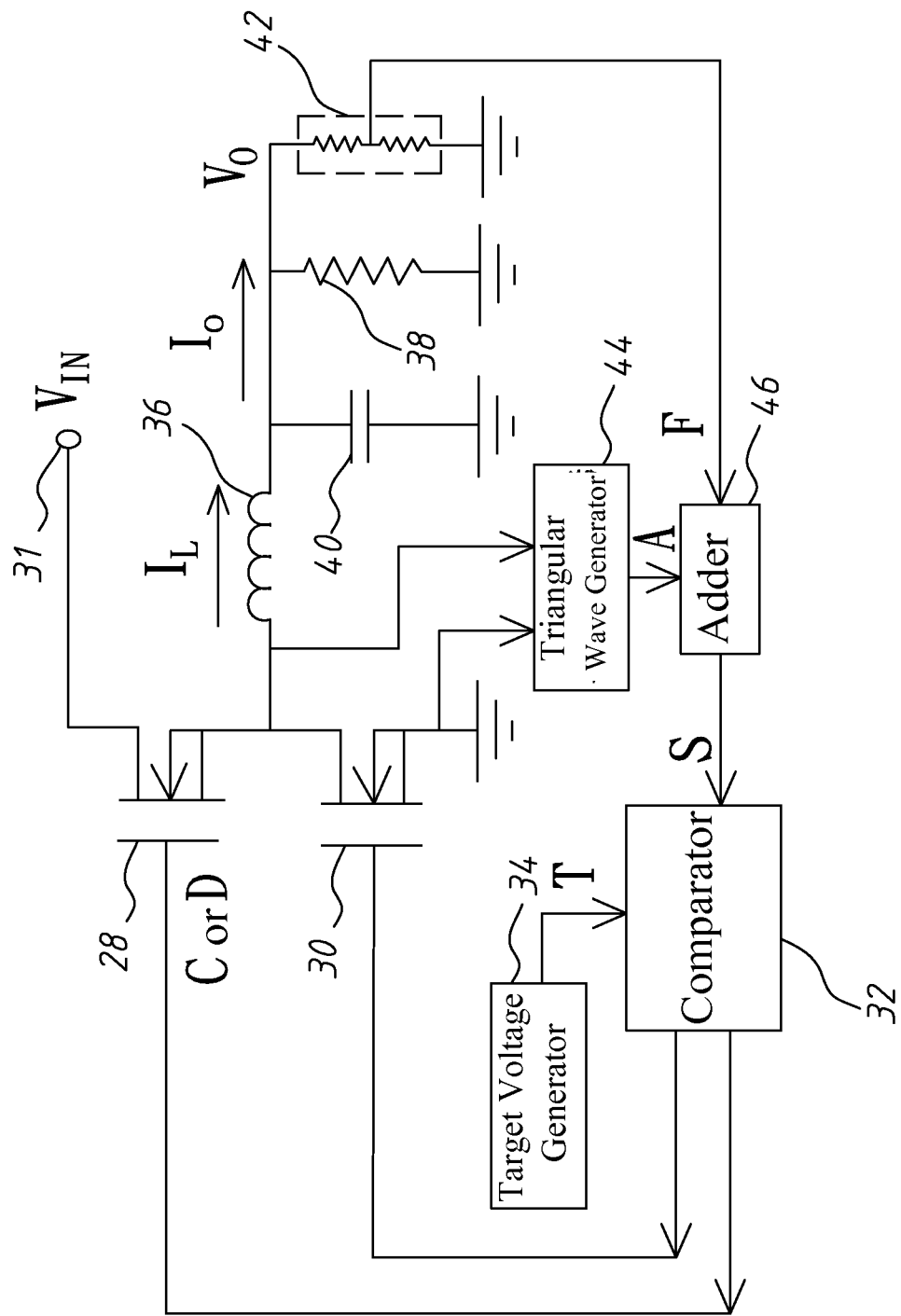
FIG. 2 is a circuit diagram of a switching controller according to the first embodiment of the present invention.

As shown in FIG. 2, a switching controller of the present invention includes a first switch 28 and a second switch 30, both of which may be field-effect transistors (FETs) as examples. Other examples include, but not limited to, Insulated gate bipolar Transistor (IGBT) and bipolar junction transistor. The first switch 28 is connected to the input voltage source 31, a comparator 32 and the second switch 30. The second switch 30 is grounded and connected to comparator 32. Comparator 32 is connected to a target voltage generator 34. The first switch 28 and the second switch 30, through a common inductor 36, are connected to one end of a load 38, where the other end of load 38 is grounded. Furthermore, load 38 is connected in parallel with a capacitor 40 and a voltage divider 42. The source and the drain of the second switch 30 are connected to a triangular wave generator 44, which together with the voltage divider are connected to an adder 46 that is connected to the comparator 32.

This switching controller mainly utilizes a control signal C or an off signal D generated by the comparator 32 for the first switch 28 to change its on/off state and drives the second switch 30 to switch. When the first switch 28 receives a high level signal as the control signal C, an input voltage $V_{IN}$ is used to update and stabilize the load voltage $V_O$ on the load 38. At this time, the first switch 28 is turned on and the second switch 30 is turned off, hence, the input voltage source 31 supply an input voltage $V_{IN}$ through the first switch 28, causing the inductor 36 to produce an inductor current $I_L$ flowing to load 38 and capacitor 40, where a portion of inductor current $I_L$ flowing to load 38 is defined as the output current $I_O$. Further, when the first switch 28 receives a low level signal as an off signal D, the first switch 28 is turned off and the second switch 30 is turned on; at this time, current flows from the capacitor 40 through the second switch 30 and the inductor 36 sequentially and gradually decreases.

Figure 3:
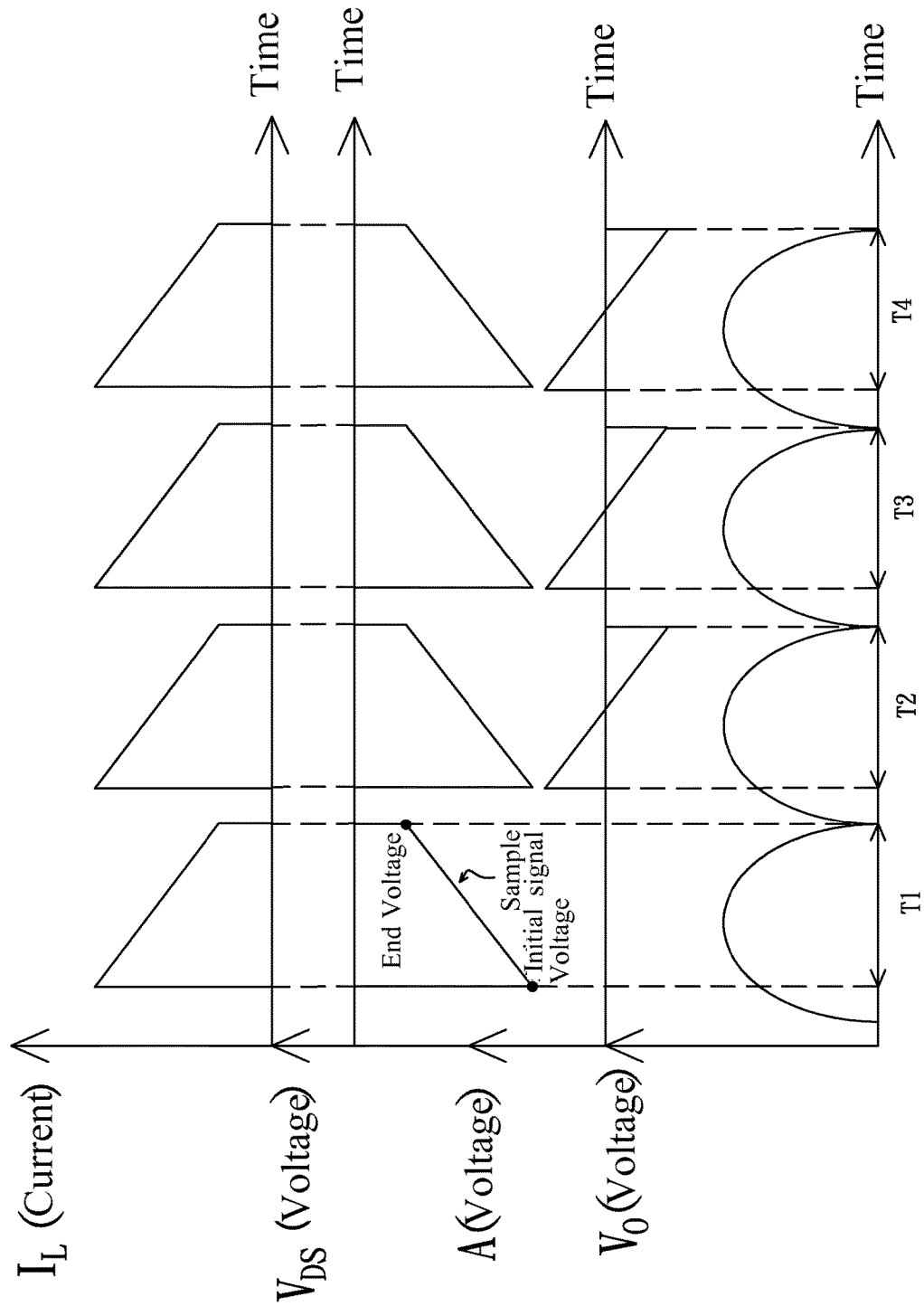
FIG. 3 is a timing diagram illustrating different waveforms of the voltage/current control according to the first embodiment of the present invention.

FIG. 3 is a timing diagram illustrating different waveforms of the voltage/current control according to the first embodiment of the present invention. First, the comparator 32 provides a high level signal as the control signal C to the first switch 28 and drives the second switch 30, causing the first switch 28 to turn on and the second switch 30 to turn off. The input voltage source 31 provide an input voltage $V_{IN}$ through the first switch 28, so that inductor 36 produces an inductor current $I_L$ flowing to load 38 and capacitor 40, producing a load voltage $V_O$ on the load 38. Voltage divider 42 divides load voltage $V_O$ to produce a feedback voltage F. Meanwhile, after the first switch 28 is turned on and the second switch 30 is turned off for some time, such as 1 microsecond (μs), the comparator 32, as set by the user, causes them to enter cycle T1, then the comparator 32 provides a low level signal as an off signal D to the first switch 28 and drives the second switch 30, causing the first switch 28 and the second switch 30 to exchange their on/off state. Because the inductor current $I_L$ is decreasing, so the waveform is a trapezoidal wave as shown in FIG. 3. At this time, the triangular wave generator 44 receives the voltage drop across the second switch 30, for example the voltage drop $V_{DS}$ between the source and drain of the FET 30, obtaining the first trapezoidal wave of the periodic trapezoidal wave signal. Each trapezoidal wave of the periodic trapezoidal wave signal consists of an initial voltage, a sampling signal and an end voltage, where the absolute value of the initial voltage is greater than the absolute value of the end voltage. Then, the triangular wave generator 44 captures the average of the initial voltage and the end voltage of this cycle T1 and stores it without generating any output signals.

Then, after the cycle T1 ended, since the triangular wave generator 44 did not output any signals, the adder 46 receives the feedback voltage signal F and then send the feedback voltage signal F as a sum signal S to comparator 32. Comparator 32 receives and compares this sum signal S with the target voltage T generated by the target voltage generator 34, and when the sum signal S is less than the target voltage signal T, the comparator 32 provides a high-level signal as the control signal C to the first switch 28 and drives the second switch 30, causing the first switch 28 to turn on and the second switch 30 to turn off. Hence the input voltage source 31 again provides an input voltage $V_{IN}$ through the first switch 28 updating and stabilizing the load voltage Vo on the load 38, while the voltage divider 42 generates a feedback voltage F through this load voltage Vo. Meanwhile, after the first switch 28 is turned on and the second switch 30 is turned off for some time, such as 1 microsecond (μs), the comparator 32, as set by the user, causes them to enter cycle T2, then the comparator provides a low level signal as an off signals D to the first switch 28 and drives the second switch 30, causing the first switch 28 and the second switch 30 to exchange their on/off state. At this time, the triangular wave generator 44 receives the voltage drop $V_{DS}$ between the source and drain of the FET 30, hence obtaining the second trapezoidal wave of the periodic trapezoidal wave signal. The triangular wave signal generator 44 receives the second sampling trapezoidal wave signal of cycle T2 that is then subtracted from the average value of previous cycle T1 resulting in a first triangular wave of a periodic triangular wave signal A, which consists of a positive voltage and a negative voltage, where the initial voltage and the ending voltage of each triangular wave of the periodic triangular wave signal are peak voltage and valley voltage respectively. Similarly, when the triangular wave generator 44 receives the second trapezoidal wave, it captures and stores the average of the initial voltage and ending voltage of this cycle T2.

At the end of the cycle T2, the adder 46 receives and combines the first triangle wave of the triangular wave signal A and the feedback voltage F to produce a sum signal S and then send it to the comparator 32. Comparator 32 receives and compares the sum signal S with the target voltage signal T, and when the sum signal S is less than the target voltage T, the comparator 32 provides a high level signals as a control signal C to the first switch 28 and drives the second switch 30, causing the first switch 28 to turn on and the second switch 30 to turn off. The input voltage source 31 again provides an input voltage $V_{IN}$ through the first switch 28 updating and stabilizing the load voltage Vo on the load 38, while the voltage divider 42 generates a feedback voltage F through this load voltage Vo. Meanwhile, after the first switch 28 is turned on and the second switch 30 is turned off for some time, such as 1 microsecond (μs), the comparator 32, as set by user, causes them to enter cycle T3, then the comparator 32 provides a low level signal as an off signals D to the first switch 28 and drives the second switch 30, causing the first switch 28 and the second switch 30 to exchange their on/off state. At this time, the triangular wave generator 44 receives the voltage drop $V_{DS}$ between the source and drain of the FET 30, hence obtaining the third trapezoidal wave of the periodic trapezoidal wave signal. The triangular wave signal generator 44 receives the third sampling trapezoidal wave signal that is then subtracted from the average value of previous cycle T2 resulting in the second triangular wave having a positive voltage and a negative voltage. When the triangular wave generator 44 receives the third trapezoidal wave, it captures and stores the average of the initial voltage and ending voltage of the cycle T3.

The switching controller of the present invention can continue to operate on the fourth trapezoidal wave of the periodic trapezoidal wave signal generated in the next cycle T4 and the third triangular wave of the periodic triangular wave signal consisting of positive voltage and negative voltage, and continues on to the subsequent cycles until the average of the triangular wave equals to zero.

The triangular wave generator 44 does not need to be connected to the source and drain of the FET 30, but if it produces a triangular wave signal A as shown in FIG. 3 to the adder 46, then it may not be required to calculate the trapezoidal wave signal, and can still achieve the purpose of updating and stabilizing the load voltage Vo.

Using the same circuit diagram shown in FIG. 2, a different method of operation is described as follows. First, comparator 32 provides a high level signal as the control signal C to the first switch 28 and drives the second switch 30, causing the first switch 28 to turn on and the second switch 30 to turn off. The input voltage source 31 then provides an input voltage $V_{IN}$ through the first switch 28, so that inductor 36 produces an inductor current $I_L$ flowing to load 38 and capacitor 40 producing a load voltage $V_O$ on the load 38, and the voltage divider 42 then divides load voltage $V_O$ to produce a feedback voltage F. Meanwhile, the comparator 32, set by user, after the first switch 28 is turned on and the second switch 30 is turned off for some time, such as 1 microsecond (μs), causes them to enter cycle T1, and the comparator then provides a low level signal as an off signals D to the first switch 28 and drives the second switch 30 causing the first switch 28 and the second switch 30 to exchange their on/off state. Since the inductor current $I_L$ is decreasing, the waveform is a trapezoidal wave as shown in FIG. 3. The triangular wave generator 44 receives the voltage drop across the second switch 30, which is the voltage drop $V_{DS}$ between the source and drain of the FET 30, hence obtaining the first trapezoidal wave of the periodic trapezoidal wave signal. Each trapezoidal wave signal consists of an initial voltage, a sampling signal and an end voltage, where the absolute value of the initial voltage is greater than the absolute value of the end voltage. Then, the triangular wave generator 44 captures the average of the initial voltage and the ending voltage of the cycle T1 and stores it without generating any output signals.

Then, after the cycle T1 ended, since the triangular wave generator 44 did not output any signals, the adder 46 receives the feedback voltage signal F and sent it as a sum signal S to comparator 32. Comparator 32 receives the signal S and compares the sum signal S with the target voltage T generated by the target voltage generator 34, and when the sum signal S is less than the target voltage signal T, the comparator 32 provides a high level signal as the control signal C to the first switch 28 and drives the second switch 30, causing the first electronic switch 28 to turn on and the second electronic switch 30 to turn off. The input voltage source 31 again provides an input voltage $V_{IN}$ through the first switch 28 updating and stabilizing the load voltage Vo on the load 38, while the voltage divider 42 generates a feedback voltage F through this load voltage Vo. Meanwhile, the comparator 32, set by user, after the first switch 28 is turned on and the second electronic switch 30 is turned off for some time, such as 1 microsecond (μs), causes them to enter cycle T2, then the comparator provides a low level signal as an off signals D to the first switch 28 and drives the second switch 30, causing the first switch 28 and the second electronic switch 30 to exchange their on/off state. At this time, the triangular wave generator 44 receives the voltage drop $V_{DS}$ between the source and drain of the FET 30, hence obtaining the second trapezoidal wave of the periodic trapezoidal wave signal, captures and stores the average of the initial voltage of the second trapezoidal wave and the end voltage of the first trapezoidal wave and stores the end voltage of the second trapezoidal wave. When the triangular wave generator receives the second sampling trapezoidal wave signal, the sampling signal of the cycle T2 is subtracted from the average value, which results in the first triangular wave of a periodic triangular wave signal A, where each triangular wave of the triangular wave signal consists of an initial voltage and an end voltage corresponding to the peak voltage and valley voltage respectively.

At the end of the cycle T2, the adder 46 receives and combines the first triangle wave of the triangular wave signal and the feedback voltage F to produce a sum signal S that is sent to the comparator 32. Comparator 32 receives and compares the sum signal S with the target voltage signal T, and when the sum signal S is less than the target voltage T, the comparator 32 provides a high level signals as a control signal C to the first switch 28 and drives the second switch 30, causing the first switch 28 to turn on and the second switch 30 to turn off. Hence the input voltage source 31 again provides an input voltage $V_{IN}$ through the first switch 28 updating and stabilizing the load voltage Vo on the load 38, while the voltage divider 42 generates a feedback voltage F through the load voltage Vo. Meanwhile, the comparator 32, set by user, after the first switch 28 is turned on and the second switch 30 is turned off for some time, such as 1 microsecond (μs), causes them to enter cycle T3, then the comparator provides a low level signal as an off signals D to the first switch 28 and drives the second switch 30, causing the first switch 28 and the second switch 30 to exchange their on/off state. At this time, the triangular wave generator 44 receives the voltage drop $V_{DS}$ between the source and drain of the FET 30, hence obtains the third trapezoidal wave of the periodic trapezoidal wave signal, and also captures and stores the average of the initial voltage of the third trapezoidal wave and the end voltage of the second trapezoidal wave, and also stores the end voltage of the third trapezoidal wave. When the triangular wave generator receives the third sampling trapezoidal wave signal, the sampling signal of this cycle T3 is subtracted from the average value, resulting in the second triangular wave of a periodic triangular wave signal A that consists of positive voltage and negative voltage.

The switching control device of the present invention can continue to operate on the fourth trapezoidal wave of the periodic trapezoidal wave signal generated in the next cycle T4 and the third triangular wave of the periodic triangular wave signal consisting of positive voltage and negative voltage, and continues on to the subsequent cycles until the average of the triangular wave signal equals to zero.

Figure 4:
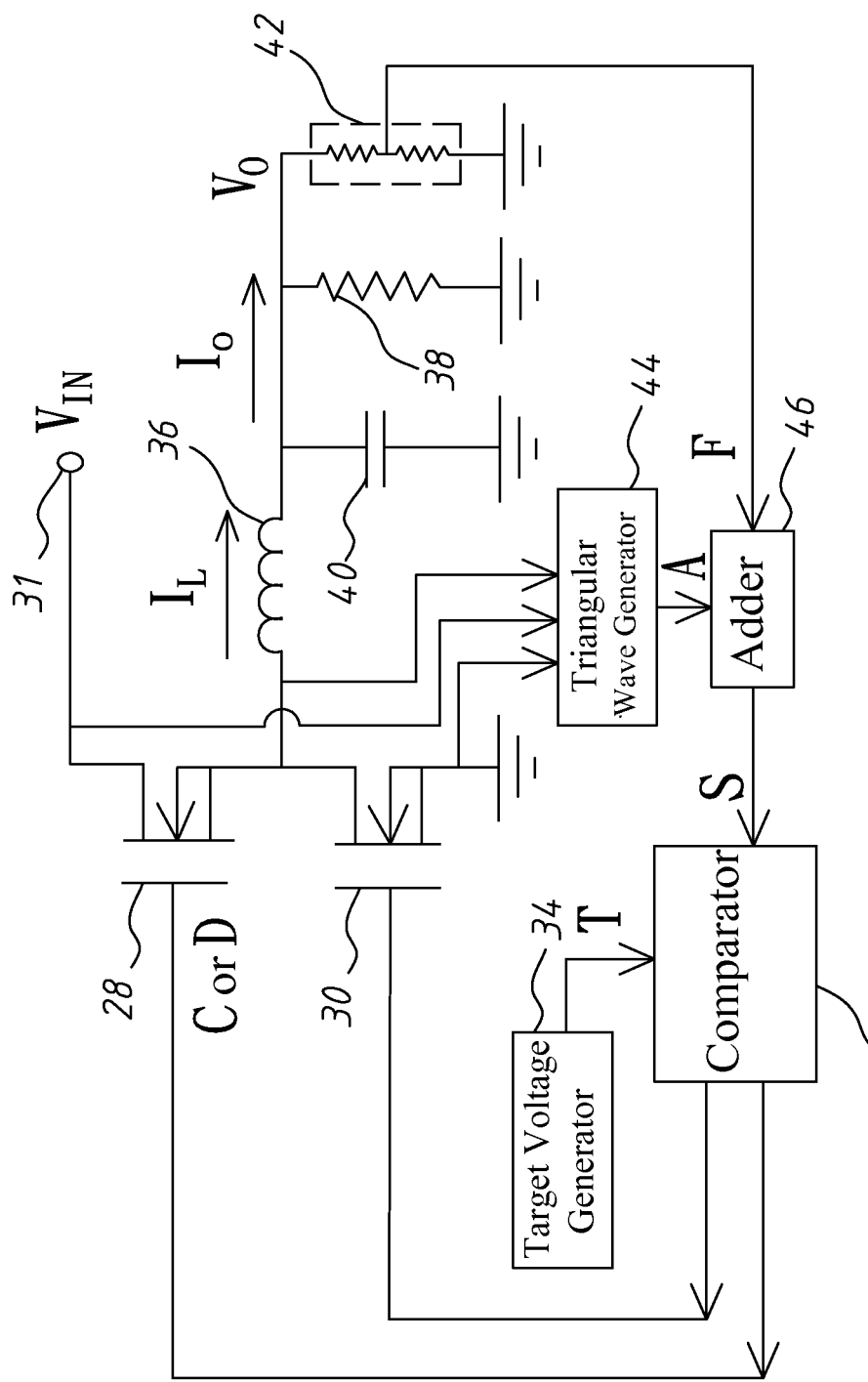
FIG. 4 is a circuit diagram of a switching controller according to the second embodiment of the present invention.
Figure 5:
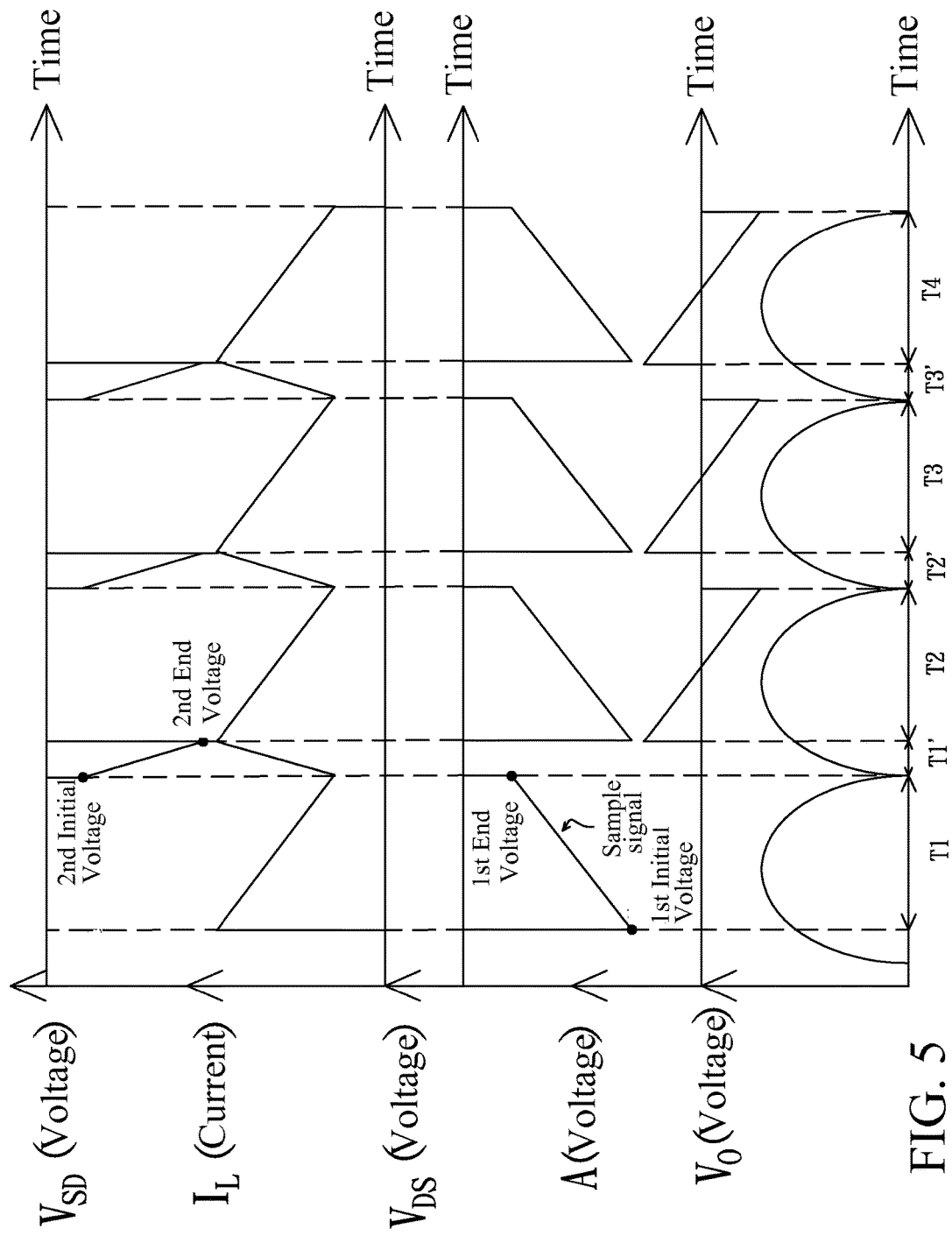
FIG. 5 is a timing diagram illustrating different waveforms of the voltage/current control according to the second embodiment of the present invention.

FIG. 4 and FIG. 5 illustrate a second embodiment of the present invention. The only difference between FIG. 4 and FIG. 2 is that the source and the drain of the FET 28 are also connected to the triangular wave generator 44. At first, comparator 32 provides a high level signal as the control signal C to the first switch 28 and drives the second switch 30, causing the first switch 28 to turn on and the second switch 30 to turn off. The input voltage source 31 provides an input voltage $V_{IN}$ through the first switch 28, so that inductor 36 produces an inductor current $I_L$ flowing to load 38 and capacitor 40, producing a load voltage $V_O$ on the load 38, then voltage divider 42 divides load voltage $V_O$ to produce a feedback voltage F. Meanwhile, the comparator 32, set by the user, after the first switch 28 is turned on and the second switch 30 is turned off for some time, such as 1 microsecond (μs), causes them to enter cycle T1, then the comparator provides a low level signal as an off signals D to the first switch 28 and drives the second switch 30, causing the first switch 28 and the second switch 30 to exchange their on/off state. Since the inductor current $I_L$ is decreasing, the waveform is a Trapezoidal wave as shown in FIG. 5. At this time, the triangular wave generator 44 receives the voltage drop across the second switch 30, which is the voltage drop $V_{DS}$ between the source and drain of the FET 30, hence obtaining the first trapezoidal wave of the first periodic trapezoidal wave signal. Each trapezoidal wave consists of a first initial voltage, a sampling signal and a first end voltage chronologically, where the absolute value of the initial voltage is greater than the absolute value of the ending voltage. The triangular wave generator 44 does not generate any output signals in this cycle.

After cycle T1 ended, since the triangular wave generator 44 did not output any signals, the adder 46 receives the feedback voltage signal F from the divider 42 and then send it to comparator 32 as a sum signal S. Comparator 32 receives and compares this sum signal S with the target voltage T generated by the target voltage generator 34, and when the sum signal S is less than the target voltage signal T, the comparator 32 provides a high level signal as the control signal C to the first switch 28 and drives the second switch 30, causing the first switch 28 to turn on and the second switch 30 to turn off. The input voltage source 31 again provides an input voltage $V_{IN}$ through the first switch 28 updating and stabilizing the load voltage Vo on the load 38, while the voltage divider 42 generates a feedback voltage F through this load voltage Vo. Meanwhile, the comparator 32, set by user, causes the first switch 28 to turn on and the second switch 30 to turn off for some time T1', such as 1 microsecond (µs). During the period T1', the inductance current is increasing, thus the waveform is a trapezoidal wave as shown in FIG. 5. At this point, the triangular wave generator 44 receives the voltage drop across the first switch 28, that is the voltage drop $V_{SD}$ between the source and drain of the FET 28, hence obtaining the first trapezoidal wave of a second periodic trapezoidal wave signal, each of this trapezoidal wave of the second trapezoidal wave signal consists of a second initial voltage and a second end voltage, where the absolute value of the second initial voltage is smaller than the absolute value of the second end voltage, and a trapezoidal wave of the second trapezoidal wave signal appears in between 2 neighboring trapezoidal waves of the first trapezoidal wave signal. Triangular wave generator 44 captures the average of second initial voltage and second end voltage of period T1' and stores it, then enters cycle T2, while the comparator 32 provides a low level signal as an off signals D to the first switch 28 and drives the second switch 30, causing the first switch 28 and the second switch 30 to exchange their on/off state. At this time, the triangular wave generator 44 receives the voltage drop $V_{DS}$ between the source and drain of the FET 30, hence obtaining the second trapezoidal wave of the first periodic trapezoidal wave signal. At the same time the triangular wave generator 44 receives the sampling signal of the second trapezoidal wave that is then subtracted from the average value stored during period T1' producing the first triangular wave of a periodic triangular wave signal, wherein each triangular wave of this triangular wave signal consists of a positive voltage and a negative voltage, and the initial voltage of each triangular wave of the triangular wave signal A is the peak voltage while end voltage of the same is the valley voltage.

At the end of the cycle T2, the adder 46 receives and combines the first triangle wave of the triangular wave signal and the feedback voltage F producing a sum signal S that is sent to the comparator 32. Comparator 32 receives and compares the sum signal S with the target voltage signal T, when the sum signal S is less than the target voltage T, the comparator 32 provides a high level signals as a control signal C to the first switch 28 and drives the second switch 30, causing the first switch 28 to turn on and the second switch 30 to turn off. The input voltage source 31 again provides an input voltage $V_{IN}$ through the first switch 28, updating and stabilizing the load voltage Vo on the load 38, while the voltage divider 42 generates a feedback voltage F. Meanwhile, the comparator 32, as set by user, causes the first switch 28 to turn on and the second switch 30 to turn off for some time T2', such as 1 microsecond (µs). During the period T2', the inductance current is increasing. At this point, the triangular wave generator 44 receives the voltage drop across the first switch 28, hence obtaining the second trapezoidal wave of a second periodic trapezoidal wave signal. Triangular wave generator 44 captures the average of second initial voltage and second end voltage of the second trapezoidal wave of period T2' and stores it, then the system enters the cycle T3, where the comparator 32 provides a low level signal as an off signals D to the first switch 28 and drives the second switch 30, causing the first switch 28 and the second switch 30 to exchange their on/off state. At this time, the triangular wave generator 44 receives the voltage drop $V_{DS}$ between the source and drain of the FET 30, hence obtaining the third trapezoidal wave of the first periodic trapezoidal wave signal. At the same time the triangular wave generator 44 receives the sampling signal of the third trapezoidal wave of this cycle T3, which is the subtracted from the average value stored during period T2' producing the second triangular wave of the periodic triangular wave signal.

The switching controller of the present invention can continue to operate on the fourth trapezoidal wave of the first periodic trapezoidal wave signal generated in the next cycle T4 and the third triangular wave of the periodic triangular wave signal consisting of positive voltage and negative voltage, and continue on to the subsequent cycles until the average of the triangular wave signal equals to zero.

When load transient changes, such as the load 38 changes from light load to heavy load, the desired output current $I_O$ increases, resulting in a current flowing through a capacitor 40 from the ground to the load 38, thus the load voltage $V_O$ will sag, causing the feedback voltage F to drop. As described above, since the triangular wave signal consists of positive and negative information, the adder 46 combines the triangle wave signal A and the feedback signal F to produce the sum signal S and comparator 32 will turn on the first switch 28 and turn off the second switch 30 when the sum signal S is lower than the target voltage signal T. As a result, during load transient, before the load voltage $V_O$ sag occurs, when the sum signal S is lower than the target voltage T, the comparator 32 will turn on first switch 28 and turn off the second switch 30 to maintain the stability of load voltage Vo. Even if the load is unchanged, the present invention utilizes the triangular wave signals described above to stabilize the load voltage Vo.

In summary, the present invention utilizes a triangular wave signal having both positive and negative information as a basis for switching the switches, to achieve the stabilization of the load voltage.

The invention claimed is:
1. A regulator control method comprising the following steps:
   receiving a periodic triangular wave signal, wherein the periodic triangular wave signal is produced by:
     (a) receiving a periodic trapezoidal wave signal, with each cycle of the trapezoidal wave signal comprising, in chronological order, an initial voltage, a sampling signal and an end voltage, wherein an absolute value of the initial voltage is greater than an absolute value of the end voltage;

(b) capturing an average of an end voltage of a first cycle and an initial voltage of a second cycle following the first cycle; and (c) subtracting a sample signal of the second cycle from the average of the end voltage of the first cycle and the initial voltage of the second cycle;

adding the periodic triangular wave signal with a feedback voltage indicative of a load voltage from a load to generate a sum signal;

comparing the sum signal to a target voltage to generate a control signal;

updating and stabilizing the load voltage using the control signal and an input voltage when the sum signal is less than the target voltage.

2. The regulator control method of claim 1, wherein an average value of the triangular wave signal is zero.

3. The regulator control method of claim 1, wherein the control signal is a high level signal.

4. The regulator control method of claim 1, wherein the initial voltage and the end voltage of each cycle of the triangular wave signal are peak voltage and valley voltage respectively.

5. The regulator control method of claim 1, wherein a voltage divider is connected to the load to divide the load voltage generating the feedback voltage.

6. The regulator control method of claim 1, wherein the load is connected to a first switch and a second switch, the second switch is connected to ground, the first switch receives the control signal and uses an input voltage based on the control signal to update and stabilize the load voltage.

7. The regulator control method of claim 1, wherein the load is connected in parallel with a capacitor.

8. The regulator control method of claim 1, wherein the second switch is connected to the triangular wave generator and delivers a voltage across the second switch to the triangular wave generator.

9. A voltage control apparatus comprising:
a feedback network, which connects to a load and generates a feedback voltage indicative of a load voltage from the load;
a triangular wave generator, which
    (a) receives a periodic trapezoidal wave signal, with each cycle of the trapezoidal wave signal comprising, in chronological order, an initial voltage, a sampling signal and an end voltage, wherein an absolute value of the initial voltage is greater than an absolute value of the end voltage; and
    (b) generates a triangular wave signal by configuring a first and a second periodic trapezoidal wave signals in a way that, given a first cycle and a second cycle following the first cycle, a sample signal of the second cycle is subtracted from an average of an end voltage of the first cycle and an initial voltage of the second cycle;
an adder, which receives and adds the feedback voltage and the triangular wave signal to produce a sum signal;
a target voltage generator, which generates a target voltage;
a comparator, which receives the sum signal and the target voltage, and generates a control signal when the sum signal is less than the target voltage; and
a switching network, which updates and stabilizes the load voltage, comprising a first switch and a second switch connected to receive the control signal and an input voltage respectively.

10. The voltage control apparatus of claim 9, wherein the control signal is a high-level signal.

11. The voltage control apparatus of claim 9, wherein the first switch is connected to the load and the second switch is connected to ground.

12. The voltage control apparatus of claim 11, wherein the load is connected in parallel with a capacitor.

13. The voltage control apparatus of claim 12, wherein the second switch is connected to the triangular wave generator, thereby producing a voltage drop across the triangular wave generator.

14. The voltage control apparatus of claim 13, wherein the adder and the target voltage generator are connected to the comparator connected to the first switch and the second switch, wherein the comparator receives and compares the target voltage generated by the target voltage generator and the sum signal then generates the control signal to the first switch and drives the second switch.

15. The voltage control apparatus of claim 14, wherein the first switch and the second switch, each having an on state and an off state, are configured to turn the second switch off when the first switch is turned on and turn the second switch on when the first switch is turned off.

16. A voltage control apparatus comprising:
a feedback network, which connects to a load and generates a feedback voltage indicative of a load voltage from the load;
a triangular wave generator, which
    (a) receives (i) a first periodic trapezoidal wave signal in which each cycle of the first periodic trapezoidal wave signal comprises, in chronological order, a first initial voltage, a first sampling signal and a first end voltage, wherein an absolute value of the first initial voltage is greater than an absolute value of the first end voltage, and (ii) a second trapezoidal wave signal in which each cycle of the second periodic trapezoidal wave signal comprises a second initial voltage and a second end voltage, wherein an absolute value of the second initial voltage is less than an absolute value of the second end voltage; and
    (b) generates a triangular wave signal by configuring the first and the second periodic trapezoidal wave signals in a way (i) that only one cycle of the second periodic trapezoidal wave signal appears between two neighboring cycles of the first periodic trapezoidal wave signal, and (ii) that in a sequence of a cycle of the second periodic trapezoidal wave signal followed immediately by a cycle of the first periodic trapezoidal wave signal, the first sample signal is subtracted from an average of the second initial voltage and the second end voltage;
an adder, which receives and adds the feedback voltage and the triangular wave signal to produce a sum signal;
a target voltage generator, which generates a target voltage;
a comparator, which receives the sum signal and the target voltage, and generates a control signal when the sum signal is less than the target voltage; and
a switching network, which updates and stabilizes the load voltage, comprising a first switch and a second switch connected to receive the control signal and an input voltage respectively.

17. The voltage control apparatus of claim 16, wherein the control signal is a high-level signal.

18. The voltage control apparatus of claim 16, wherein the first switch is connected to the load and the second switch is connected to ground.

19. The voltage control apparatus of claim 18, wherein the load is connected in parallel with a capacitor.

20. The voltage control apparatus of claim 19, wherein the second switch is connected to the triangular wave generator, thereby producing a voltage drop across the triangular wave generator.

\* \* \* \* \*